United States Patent
Heikes

[11] Patent Number: 6,015,049
[45] Date of Patent: Jan. 18, 2000

[54] UP-FLOW FISH GRADER APPARATUS AND METHOD

[75] Inventor: David L. Heikes, Pine Bluff, Ark.

[73] Assignee: The Board of Trustees of the University of Arkansas, Little Rock, Ark.

[21] Appl. No.: 09/144,035

[22] Filed: Aug. 31, 1998

Related U.S. Application Data

[60] Provisional application No. 60/062,704, Oct. 22, 1997.

[51] Int. Cl.$^7$ .............................. B07B 13/05; B07B 1/28
[52] U.S. Cl. ......................... 209/675; 209/311; 209/315; 209/906; 209/659
[58] Field of Search ................................ 209/675, 906, 209/660, 395, 659, 311, 315, 393

[56] References Cited

U.S. PATENT DOCUMENTS

| | | | |
|---|---|---|---|
| 3,833,119 | 9/1974 | Brown | 209/675 |
| 4,086,875 | 5/1978 | Lindbergh . | |
| 4,198,925 | 4/1980 | Lindbergh . | |
| 4,351,438 | 9/1982 | Morton | 209/675 |
| 4,854,455 | 8/1989 | Faivre . | |
| 5,248,046 | 9/1993 | Rollason | 209/675 |
| 5,253,610 | 10/1993 | Sharber | 119/215 |
| 5,816,196 | 10/1998 | Webster et al. | 119/228 |

FOREIGN PATENT DOCUMENTS

| | | | |
|---|---|---|---|
| 581604 | 5/1924 | France | 209/660 |

OTHER PUBLICATIONS

Tucker, C.S., Channel Catfish Culture, Developments in Aquaculture and Fisheries Science (1985)(§11.3).

Dorman, Larry, Grader Spacing and Length–Weight Relationship for Commercially Reared Fish, Arkansas Aquafarming (vol. 9, No. 2, Apr. & Jun. 1991).

Greenland, Donald C. & Gill, Robert L., Development and Operation Efficiency of a Catfish Grader, Progressive Fish–Culturist (vol. 34, No. 2, Apr. 1972)(pp. 76–80).

Greenland, Donald C., Ellis, James E., and Gill, Robert L., Operating and Design Criteria of an Adjustable Horizontal Bar Grader for Sorting Channel Catfish, Progressive Fish–Culturist, (vol. 34, No. 4, Oct. 1972)(pp. 186–190).

Huner, Jay V., Dupree, Harry K. and Greeland, Donald C., Harvesting, Grading, and Holding Fish, Third Report to the Fish Farmers: The Status of Warmwater Fish Farmers and Progress in Fish Farming Research, U.S. Fish & Wildlife Service, Washington, D.C.

Jensen, G.L., Handbook for Common Calculations in Finfish Aquaculture, Louisiana Cooperative Extension Service, Louisiana State University, Baton Rouge, Louisiana (1988).

Jensen, G.L., Sorting and Grading Warmwater Fish, Southern Regional Aquaculture Center Publication No. 391 (Fact Sheet 9059).

(List continued on next page.)

*Primary Examiner*—Donald P Walsh
*Assistant Examiner*—Donald K. Sell
*Attorney, Agent, or Firm*—J. Charles Dougherty

[57] ABSTRACT

An apparatus for the grading of fish into various size categories, utilizing a series of panels with progressively smaller spaces between grading bars on the panels. The panels are attached to a panel box that may be raised or lowered within a holding vat. Water constantly flows through the holding vat, up through the panel box, and out over a spillway at the top front of the holding vat. By raising the panel box, the largest fish are forced out of the holding vat and down the spillway by the grading bars on the panels inside the panel box. Smaller fish swim through the grading bars on the panels with wider spaces between grading bars, and are not forced out of the holding vat until a lower panel with narrower spaces between grading bars is raised to the edge of the spillway. The constant flow of water up and toward the spillway causes the fish to instinctively swim downward and align themselves parallel to the grading bars and keeps the fish oxygenated during the grading process.

14 Claims, 6 Drawing Sheets

OTHER PUBLICATIONS

Lovshin, Leonard L., and Phelps, Ronald P., Evaluation of a Mechanical Grader to Separate Fingering Channel Catfish, *Ictalurus punctatus,* into Length Groups, Journal of Applied Aquaculture (1994)(pp. 285–296).

Tucker, Craig S. and Robinson, Edwin H., Channel Catfish Farming Handbook (Van Nostrand Reinhold 1990).

Aquacenter 1997 Supply Catalog (p. 67).

Aquatic Eco–Systems, Inc. 1997 Catalog (p. 87).

Aquaculture Magazine 1997 Buyer's Guide (pp. 182, 183).

Sample, W. David, Grading as a Means of Estimating Catfish Fingerling Numbers, Aquaculture Magazine (May/Jun. 1993)(pp. 81–84).

Heikes, David L., Progress Report to Catfish Farmers of Arkansas (1996).

UP-FLOW FISH GRADER APPARATUS AND METHOD

This application claims benefit of Provisional Application Ser. No. 60/062,704 filed Oct. 22, 1997.

FIELD OF THE INVENTION

The present invention relates generally to an apparatus and method for separating fish into groups based upon their size. The present invention relates particularly to a fish grading apparatus that comprises stacked panels with openings of progressively narrower widths, such that fish pass downward through each panel until they reach a panel with openings too narrow to pass through, and a method for using such apparatus.

BACKGROUND OF THE INVENTION

The past decade has seen a dramatic increase in demand for freshwater foodfish, such as catfish, as well as many varieties of baitfish. As the aquaculture industry expands and matures, more efficient farming methods must be developed. One problem that has plagued aquaculturists is the difficulty of predicting harvest dates and maintaining accurate inventory records. This problem is confounded by stocking fish of various sizes and also due to natural processes such as competition for food, which results in a pond with fish of various sizes.

The aquaculturist must be able to predict the most probable harvest date at which an adequate number of fish in a particular pond have reached the optimum harvest size. The problem of size variance in a fish pond makes prediction of the best harvest time difficult. Computer software applications such as Fishy 3.2 (developed at Mississippi State University) can significantly improve harvest predictions, provided that population size distribution information is available at stocking. A simple and efficient method of sampling a fish population to determine the relative size distribution of fish being stocked in a particular pond would greatly increase the accuracy of a farmer's best harvest date prediction, and thereby maximize a farmer's profits when harvest is performed as closely to the ideal date as possible.

Accurate estimation of harvestable fish inventories is important for fish processing facilities as well. Harvested fish are transported live to the processing facility to ensure a high-quality product. For maximum efficiency, processors must schedule the arrival of fish at the facility so that the processing equipment is continuously in operation but also so that a minimum number of fish are waiting to be processed. If a farmer's earlier estimate of the harvest date is wrong, such that the number of fish harvested is more or less than expected, the scheduling necessary for efficient processing is made impossible. The result is inefficient use of fish processing capital and possible spoilage or additional handling of harvested fish.

Another problem within the aquaculture industry relates to the valuation of fish at the time of harvest. For transport to the processing facility, harvestable size fish are typically removed from the growing pond and placed in a tanker truck. Unlike many other farm products, it is not possible to accurately value fish based merely on the raw weight of fish collected. This is because fish in different size categories have different per pound values. For example, catfish processors utilize automatic fillet machines that are calibrated for fish in a particular size range. Fish that are too large or two small must be processed by hand and are therefore worth less on a per pound basis. A standardized method is needed to sample the size distribution of a population of fish at harvest time that is quick enough to not significantly slow the progress of the fish to the processing facility. A significant delay at this critical time can result in additional stress to the fish and potential spoilage before the fish arrive at the processing facility.

Numerous fish grading mechanisms have been developed to solve one or more of these problems. One type of prior art fish grader consists of a series of gratings in a floating box through which fish are poured. The largest fish stop on the largest grating, whereas smaller fish pass through and stop on one of the gratings with progressively narrower openings. One problem with this fish grader is that the fish must align themselves with the grating bars and must physically swim through the grating bars if they are small enough. Fish that are disoriented, which is often the case during handling, tend to be caught on the larger grating even if they might pass through if aligned properly. This type of grader is particularly inappropriate with catfish, since catfish typically extend their fins when under stress and thereby hold themselves between the bars of a grating large enough for them to otherwise slide through. Such fish will thus be misgraded as a size larger than they actually are.

Another problem with this type of grader is that since there is little or no water flow to the fish during the grading process, the fish may suffer health problems from oxygen depletion. This problem is particularly acute because fish are typically quite crowded when entering the main bin of a fish grader before the grading process begins. The high fish density and lack of water flow may also lead to other problems related to water quality.

This type of fish grader also suffers from a problem related to the design of the gratings themselves. To accurately grade fish, the bars in the gratings must be maintained at a precise distance from each other along their entire length. Prior art gratings accomplish this by means of a cross bar attached to the grating bars at various points along their length. A fish's tail may easily hang on these crossbars, thereby preventing the fish from slipping through the larger grating, resulting in a fish that is graded as a size larger than its actual size.

Yet another problem with this type of fish grader is that once fish are caught on the grader panel, the panel must be turned over so that the fish are removed. This process places stress on the fish both because the fish are removed from the water and because the fish are jostled about as the grader panel is turned over. This process is also labor intensive and not practical for large numbers of fish.

Another type of prior art fish grader consists of a box with progressively smaller gratings placed horizontally with respect to each other. Water is forced through the box from the end with the smallest grating to the other end with the largest gratings, and fish swim against the current from the largest grating end to the point where they encounter a grating through which they can no longer pass. A significant problem with this type of grader is that fish tend to swim back between the bars of the larger gratings before the distinct size groups can be removed, and are thereby misgraded. Also, removal of the various size groups is accomplished through manually dipping the fish out, which is not practical as part of a large-scale aquaculture operation.

A third type of prior art box-type grader, described in U.S. Pat. No. 4,198,925 issued to Lindbergh, consists of a floating box which is generally open to the top with at least one side having a grating through which fish of a small enough size can pass through. The major problem with this type of grader is that it can only grade one size group at a time and relies on passive grading. Fish must be crowded to encourage grading.

The aforementioned graders are relatively slow in operation. The speed of the grading operation is particularly important when fish are being graded as the fish are being loaded for transport to a processing facility. Because of the extremely short time during which fish must be processed after removal from the water, any delay during the collection process may result in down time at the processing facility and/or additional stress on the fish.

A fourth type of prior art fish grader operates by inserting one fish at a time into an opening at the junction of two conveyor belts set at an angle to one another. One example of such a device is the Fischtechnik Model FGM 12/1, produced by Fischtechnik Fredelsloh of Moringen, Germany. At the near end, the belts of this device form a V-shaped channel in which a fish is placed. The conveyor belts are farther apart at their far end, resulting in a gradually increasing gap between the belts as the fish is pulled by the conveyor belts toward the far end. As the fish travels along the belts, the gap eventually becomes large enough that the fish drops through to one of several waiting collection bins below. The size of the fish determines how far along the belts the fish is when it drops, and therefore which bin into which the fish falls. This type of grader is extremely slow in operation, since it can only handle one fish at a time. It is also inaccurate since fish can easily catch their fins on the conveyor belts as they travel and thus fall into a bin designed to catch larger fish. This problem is particularly acute with catfish, which tend to extend their fins when under stress such as that caused by their removal from the water. This type of fish grader is also quite expensive to build because of the large number of precision moving parts.

A fifth type of prior art grader, described in U.S. Pat. No. 4,351,438 issued to Morton, consists of an apparatus that includes an elevated tank. Fish travel from this tank by gravity through a series of gratings that separate the fish into different size groups. One problem of this grader is that the fish may strike the gratings perpendicular to the grating bars and be misgraded as a result. Also, fish species such as catfish may extend their fins and thereby inhibit grading when the fish is out of the water.

SUMMARY OF THE INVENTION

The present invention is directed to a fish-grading apparatus and method that takes advantage of fishs' natural instinct to swim down and into a current such that the fish align themselves for optimum performance of the grader. The apparatus broadly consists of an open-topped holding vat into which fish to be graded may be poured. On the front top edge of the holding vat is a spillway, which angles downward on its edge furthest from the holding vat. A sliding panel box fits closely within the holding vat and holds two or more grading panels. These panels feature a series of parallel bars and are situated one above another, with the lower panels having progressively narrower openings between their bars. The panels are aligned at a small angle to the plane parallel to the top of the holding vat, with the lowest edge of the panels nearest the front side of the holding vat. The crossbars that support the grading bars are well below the grading bars, and are connected to the grating bars by long supports.

The panel box may be raised or lowered so that the grading panels emerge from the top of the holding vat in sequence, the panel with the largest openings rising first. A constant flow of water is maintained through the holding vat during the grading process. The water flows up from the back of the holding vat and out of its top down the spillway.

To grade fish using the present invention, the panel box must be lowered to its lowest position so that the topmost grading panel is below the top of the holding vat. The fish to be graded are poured into the top of the holding vat. Since the water flows parallel to the bars of the grating panels from the back of the holding vat to the spillway, the fish will instinctively align themselves parallel to the grating panels with their tails facing the spillway. As the insert box is raised, the fish that are small enough to pass through the largest grating do so, while the others are caught against the bars of the grating. Essentially, the fish grade themselves since those that are small enough will swim against the current parallel to the panel bars and thereby pass through the bars to the next panel. only those that are too large to fit through will remain behind as the panel is raised. The slight angle of the panel causes the caught fish to slide backwards toward the spillway as the first panel is raised above the top of the holding vat. The constant flow of water over the spillway eliminates the need to remove the panel and turn it over to collect the graded fish, since the water washes the fish off of the panel and down the spillway. This process is repeated as progressively smaller fish are caught on each panel as the panel box is raised until no fish remain in the holding vat. To separate the fish, a different basket is placed under the spillway as each panel is raised above to the top of the holding vat, or the fish can be routed to different distribution channels with a pivoting cutting chute attached to the spillway.

The angle at which the panels inside the panel box are set is important to maximize the efficiency of the fish grading process. The angle must be as low as reasonably possible so that the holding vat will contain room for a sufficient number of panels. However, if the angle is set too low, the fish will not slide off of the bars of the grading panel and down the spillway into the grading baskets.

The present invention is particularly designed to be mounted on a mobile trailer so that it may be quickly and easily brought adjacent to a pond or other source of fish for quick and convenient field grading. The trailer may be pulled by a truck up to the pond where the fish are located and quickly pulled away so that, if the fish are being graded prior to processing, the delay in bringing the fish from the pond to the processing facility is minimized. It can also be situated adjacent to a holding unit facility where fish of different sizes may be routed to different vats. The trailer may include leveling jacks on each corner to ensure that the grader is level during operation.

The present invention overcomes the problem of previous fish graders through which fish must be poured because the present invention causes the fish to instinctively align themselves parallel with the panel bars in an effort to swim against the current. The problem of fish being disoriented and striking the bars crosswise and not passing through is thus avoided. Also, the placement of the crossbars well below the grating bars prevents the tails of fish from hanging on the crossbar and resulting in misgraded fish. The particular problem faced by fish such as catfish extending their fins is avoided because the fish in the present apparatus are not forced through the panel bars, but slip through under their own power as they swim against the current. A fish swimming under its own power will not extend its fins so as to block its passage through the panel bars.

The present invention also remedies the problems of the horizontal fish grader, since the fish will not swim back through the panels with wider spaces between bars after passing through, provided that the current is sufficient to keep the fish oriented without being so strong as to tire or push the fish back up through the gratings. The flow of water is easily adjusted by turning a valve. Although the prior art horizontal fish grader utilized a current of water to orient the fish, it did not overcome the fish's instinct to swim down at the same time. This resulted in fish becoming too crowded at the bottom of the horizontal grader and thus many fish would swim back through the grates to avoid the high density situation. The present invention takes advantage of both of these strong instincts.

Another advantage of the present invention is that the fish need not be removed from water during the grading process. Fish losses from grading increase dramatically when fish are removed from water during the process. Removal from water also causes some fish, such as catfish, to extend their fins which greatly complicates the grading process.

The present invention allows the grading of fish to take place much more rapidly as well. First, there is no reason to remove the panels and turn them over as each class of fish is being separated. The next panel need only be raised to the appropriate level and the next level of fish is washed over the spillway by the constant flow of water. Also, unlike the conveyor belt fish grader, a large number of fish may be graded simultaneously. Since water is constantly flowing through the holding vat, fish may be crowded into the present invention without danger of oxygen depletion or other water quality problems. The only limitation on the number of fish graded simultaneously is the size of the fish and the volume of the holding vat. To reset the present invention for the next batch of fish to be graded, the operator need only lower the panel box to its lowest point and pour the next batch of fish into the holding vat.

OBJECTS OF THE INVENTION

An object of the invention is to provide a mechanism for grading fish using a flow of water through a series of grating panels such that the water flow causes the fish to instinctively align themselves parallel to the bars of the grating.

It is a further object of the invention to provide a constant water flow to the fish during the entire grading process to maintain the health of the fish.

It is a further object of the invention to keep fish immersed in water during the entire grading process, thereby reducing the stress on the fish caused by the grading process and reducing the danger of fish losses during grading.

It is a further object of the invention to provide grading panels in a fish grader with crossbars well below the panel grading bars so that fish too large to swim through the bars may slide off the grading bars and be evacuated from the grader without catching their tails or other body parts on the crossbars.

It is a further object of the invention to prevent fish from swimming back through the larger grading panels through which they have already passed by establishing a current up through the grading apparatus in the direction of the larger grading panels so that the fish will instinctively swim down and into the current and therefore swim away from the larger grading panels.

It is a further object of the invention to allow fish to be sorted quickly by allowing the fish to sort themselves in reaction to an upward flowing current of water.

It is a further object of the invention to allow the grading of fish on a mobile unit that may be quickly deployed at the side of a pond.

These and other objects and advantages of the present invention will be apparent from a consideration of the detailed description of the preferred embodiments in conjunction with the drawings which are briefly described as follows:

DETAILED DESCRIPTION OF THE PREFERRED EMBODIMENTS

Figure 1:
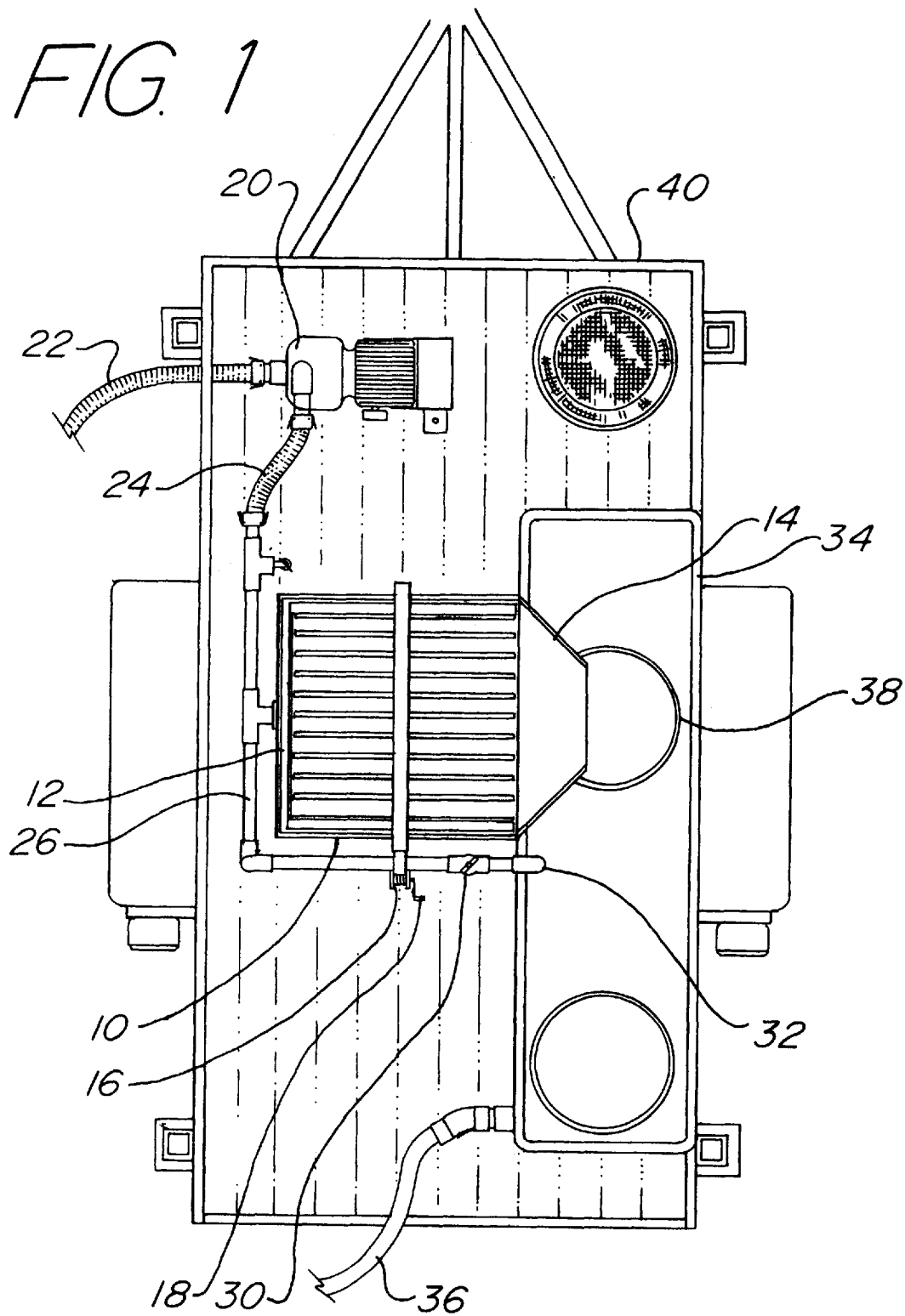
FIG. 1 is a top plan view of a preferred embodiment of the disclosed including a mobile trailer.
Figures 2, 3:
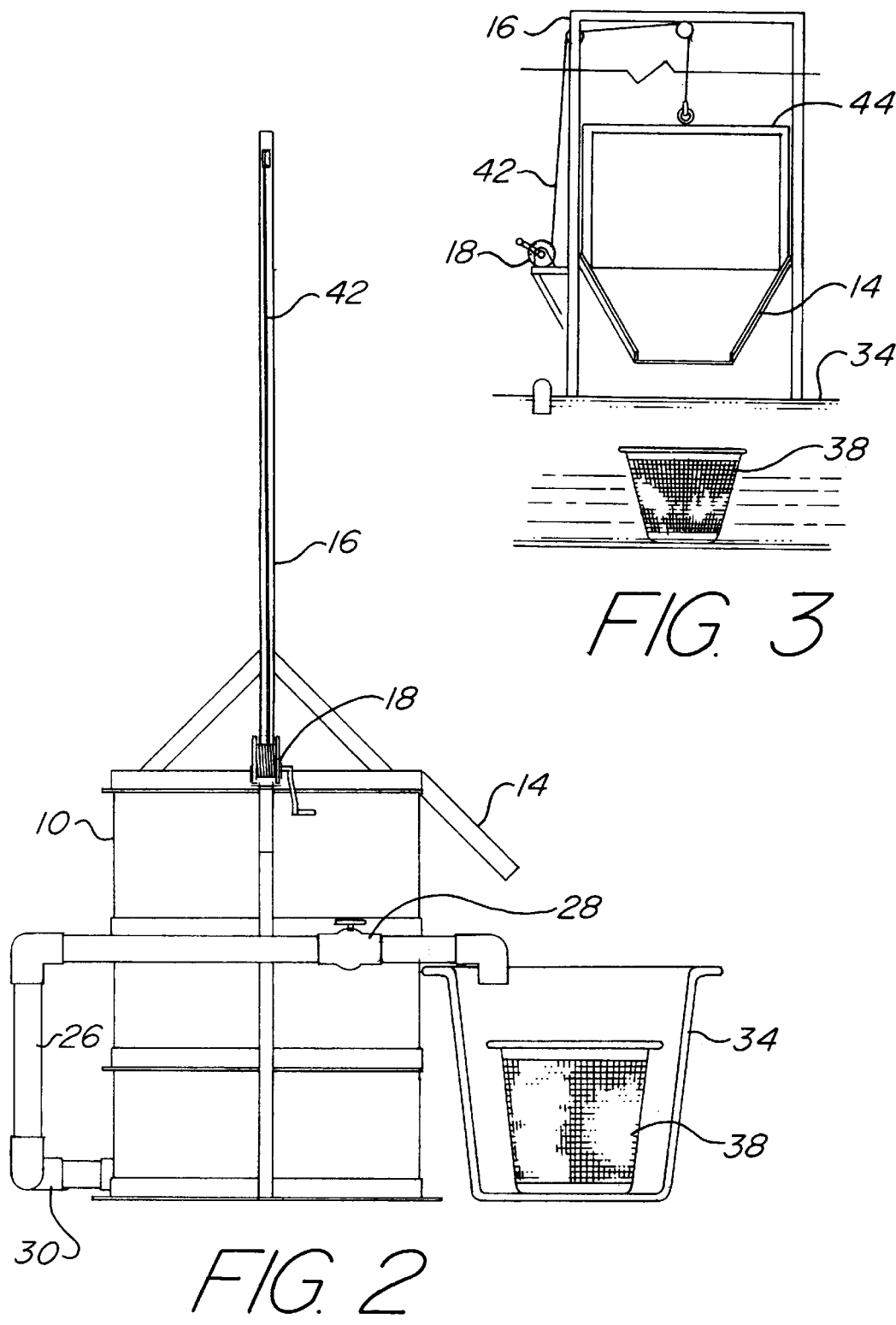
FIG. 2 is a side plan view of a preferred embodiment of the disclosed invention.
FIG. 3 is a front plan view of a preferred embodiment of the disclosed invention.

Referring to FIG. 1, the general structure of a preferred embodiment of the disclosed invention may be described. Holding vat 10 is a generally rectangular water-tight box open on the top end. Inside holding vat 10 is panel box 12 with open top, bottom and front which fits within and closely against the inside walls of holding vat 10. Panel box 12 may have mesh or screening material around its top (not shown) to prevent the fish entering the panel box from jumping back out during loading. Mounted on the front top edge of holding vat 10 is spillway 14. Spillway 14 has a wide end that is attached at holding vat 10 and a narrow end that hangs outward and downward f rom the wide end. As shown in FIGS. 2 and 3, pulley assembly 16 includes a U-shaped support that stretches over holding vat 10 with a pulley mounted on the crossbar above the center of holding vat 10. Crank 18 is attached to one of the support bars of pulley assembly 16. Cable 42 is attached to crank 18 and runs over the pulley of pulley assembly 16 and down to panel box hanger 44 which is attached to panel box 12.

In an alternative embodiment, pulley assembly 16, crank 18, and cable 42 may be replaced by an electric winch or a hydraulic lift system. The use of a hydraulic lift system would eliminate the need for the pulley assembly 16, which may block the loading of fish if such loading is done with a boom truck or similar overhead device.

Referring again to FIG. 1, water pump 20 is shown which draws water f rom a water source such as a nearby pond through water source conduit 22. Water is pumped by water pump 20 through water transfer conduit 24 into vat feed pipe 26. Water may exit water transfer conduit 24 either through feed pipe connector 28 into the back of holding vat 10 or through vat overf low outlet 32 into basket tub 34. Vat feed valve 30 mnay be used to regulate the amount of water that is allowed to flow through vat overflow outlet 32, and thereby also regulate the amount of water flowing into holding vat 10. Water flowing into holding vat 10 rises to fill holding vat 10 and panel box 12 which then flows out over spillway 14 into basket tub 34. Water flowing out through overflow outlet 32 flows directly into basket tub 34. Water entering basket tub 34 may be drained from basket tub 34 into an external reservoir such as a nearby pond through tub outlet conduit 36.

Figure 10:
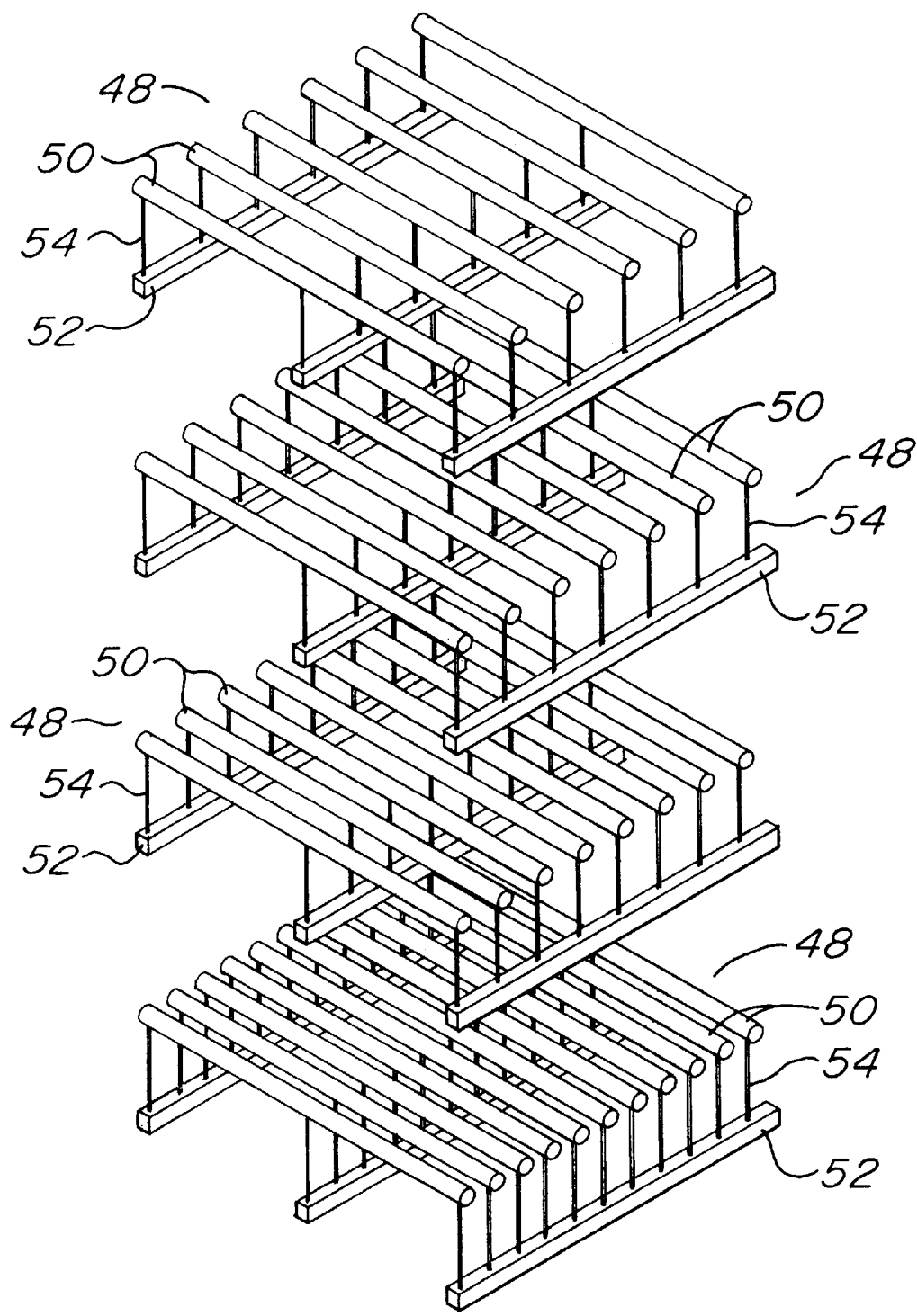
FIG. 10 is a perspective view showing four grading panels of progressively smaller sizes from top to bottom.

Referring now to FIG. 10, the structure of grading panels 48 may be described. Each grading panel 48 has a plurality of grading bars 50 that are evenly spaced apart along their length. The grading bars are supported by panel crossbars 52, which are connected to grading bars 50 by panel bar supports 54. In a preferred embodiment designed for the grading of catfish, the panel bars 50 are constructed of standard ½" CPVC pipe. Panel crossbars 52 in this embodiment may be constructed of 1" square aluminum tubing, with panel bar supports 54 consisting of stainless steel machine screws.

Figure 5:
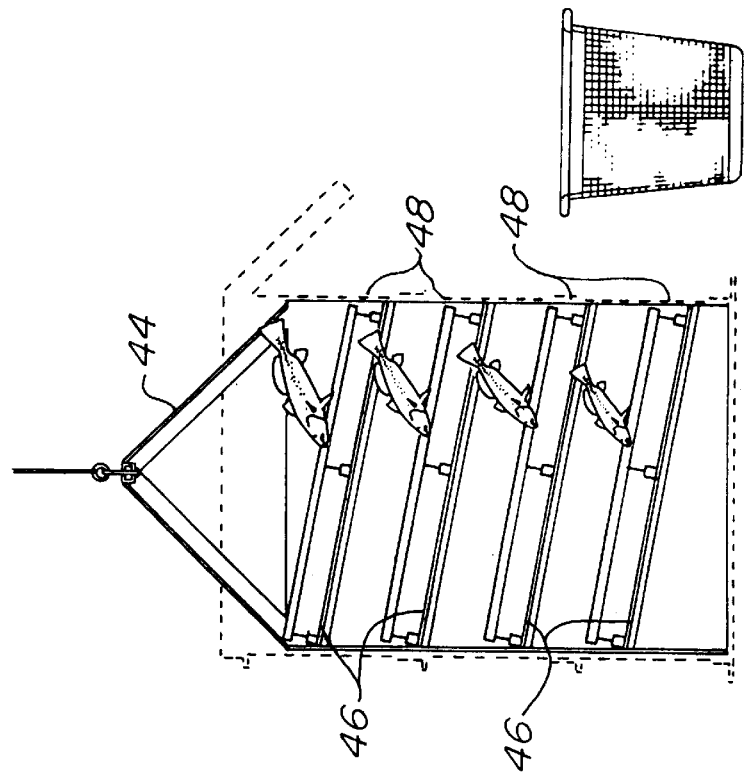
FIG. 5 is a side plan view, in cross-section, showing the grading panels within the panel box and fish of different sizes being graded within the panel box.

As shown in FIG. 5, a series of grading panels 48 are placed in panel box 12 and rest on panel box rails 46. Panel box rails 46 are attached in pairs to opposite inside side walls of panel box 12. The outer bottom edges of panel crossbars 52 rest on panel box rails 46 when each grading panel 48 is in place. Panel box rails 46 are set at an angle inclining toward the end of panel box 12 that faces spillway 14. It has been found that an angle of about 12° with the horizontal works well for typical size ranges of commercial catfish. The optimum angle will vary, however, depending upon the graded fishs' body proportions, the size of fins and other protruding features, the fishs' swimming strength, and the fishs' behavior such as tendencies to leap from the water.

Panel box rails 46 may be secured in place so that this angle is constant or may be mounted inside panel box 12 using a pivoting connection point such that the angle of incline toward spillway 14 is adjustable. Grading panels 48 may be secured in place using any convenient fastener. Since grading panels 48 are removable, any size or type of grading panels 48 may be easily substituted in panel box 12 to grade different sizes of fish or to quickly change to grading of a different species of fish. It should also be noted that it is not necessary to place a grading panel 48 on each set of panel box rails 46, so that fish can be broken into any number of size classes desired, up to the maximum number of grading panels 48 that may be inserted in panel box 12.

Referring now to FIGS. 4–9, the method of operation of the fish grader apparatus may be described. Before adding fish to the fish grader, holding vat 10 is filled with water and a constant flow of water is maintained through holding vat 10 such that water flows from the bottom back of holding vat 10, up through the suspended panel box, towards the top front of said holding vat and then over spillway 14. The optimal quantity of water flowing through holding vat 10 depends upon the species and size of fish being graded, the relative health of the fish, and the temperature of the water. The amount of water flowing through holding vat 10 is regulated using vat feed valve 30. Fish that have greater swimming strength will generally require a larger flow of water through holding vat 10 for the grading operation to move at the highest possible speed.

Figure 4:
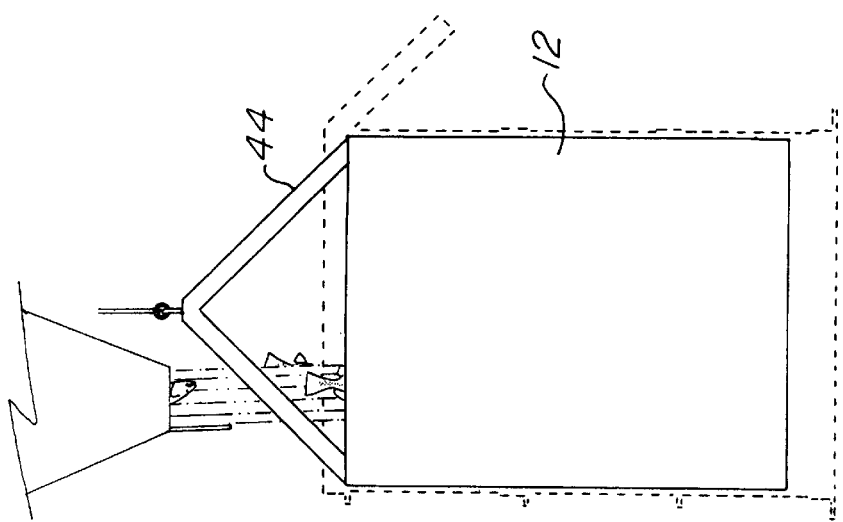
FIG. 4 is a side plan view, in cross-section, showing the panel box of a preferred embodiment of the disclosed invention with fish being added to the top of the holding vat.

As shown in FIG. 4, fish are added through the open top of holding vat 10 and into panel box 12 when panel box 12 is fully lowered into holding vat 10. The water flow through holding vat 10 and over spillway 14 causes the fish in holding vat 10 to orient themselves facing the current as shown in FIG. 5, with their tails pointed toward spillway 14. Since each grading panel 48 has panel bars 50 that are closer together than those of the grading panel 48 above it, only the smallest fish are able to swim against the current to reach the lowest level inside holding vat 10. The largest fish will be unable to swim through even the top grading panel 48 and are held at the top of holding vat 10.

The constant flow of water toward spillway 14 will cause the fish to instinctively orient themselves so that their bodies are parallel with the panel bars 50 of grading panels 48. This facilitates the passing of fish between panel bars 50 if the fish are small enough to do so. Also, the constant flow of water prevents fish that instinctively extend their fins when trapped or stressed, such as catfish, from being caught on panel bars 50 due to their fins. When swimming against the current, such fish will keep their fins close to their bodies and thereby slip through those of grading panels 48 which they are small enough to fit through.

Figure 6:
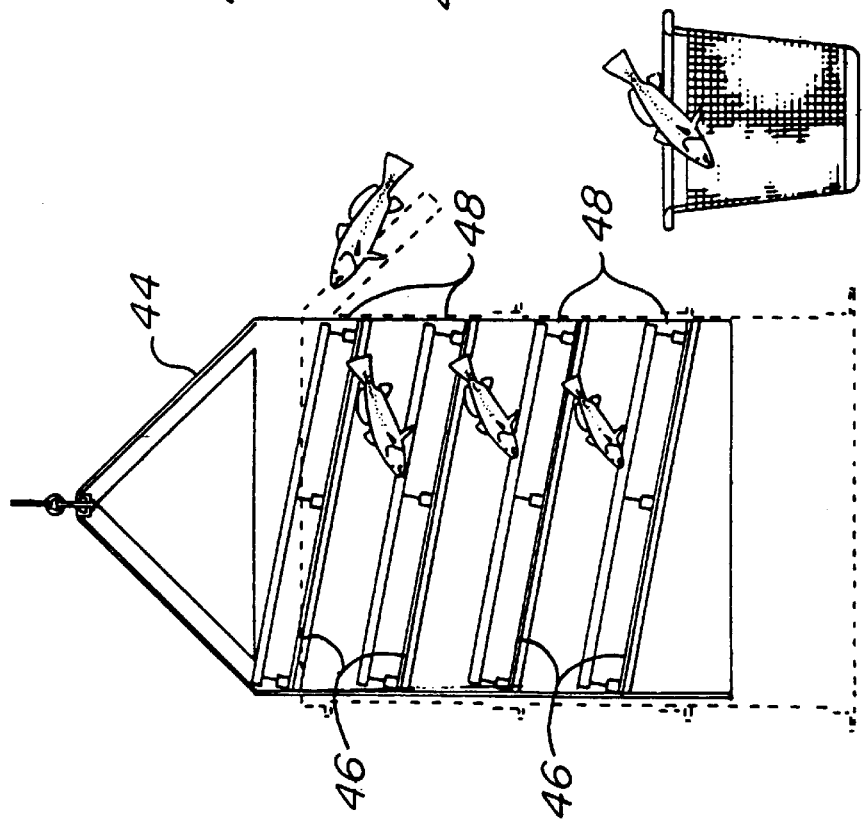
FIG. 6 is a side plan view, in cross-section, showing the panel box and grading panels within the panel box raised such that the first grading panel is level with the spillway.

As shown in FIGS. 6–9, fish are separated into size classes by raising panel box 12. Panel box 12 may be raised using crank 18, which winds cable 42 over the pulley of pulley assembly 16. As the lower edge of the top grading panel 48 reaches the edge of spillway 14, as shown in FIG. 6, the fish too large to pass through the panel bars 50 of the top grading panel 48 will slide down the panel bars 50, down spillway 14, and into basket 38 waiting below. Basket 38 sits in basket tub 34, which has a constant flow of water into it from overflow outlet 32 and spillway 14. The fish in basket 38 are maintained in a healthy state due to the constant waterflow into basket tub 34.

Figure 7:
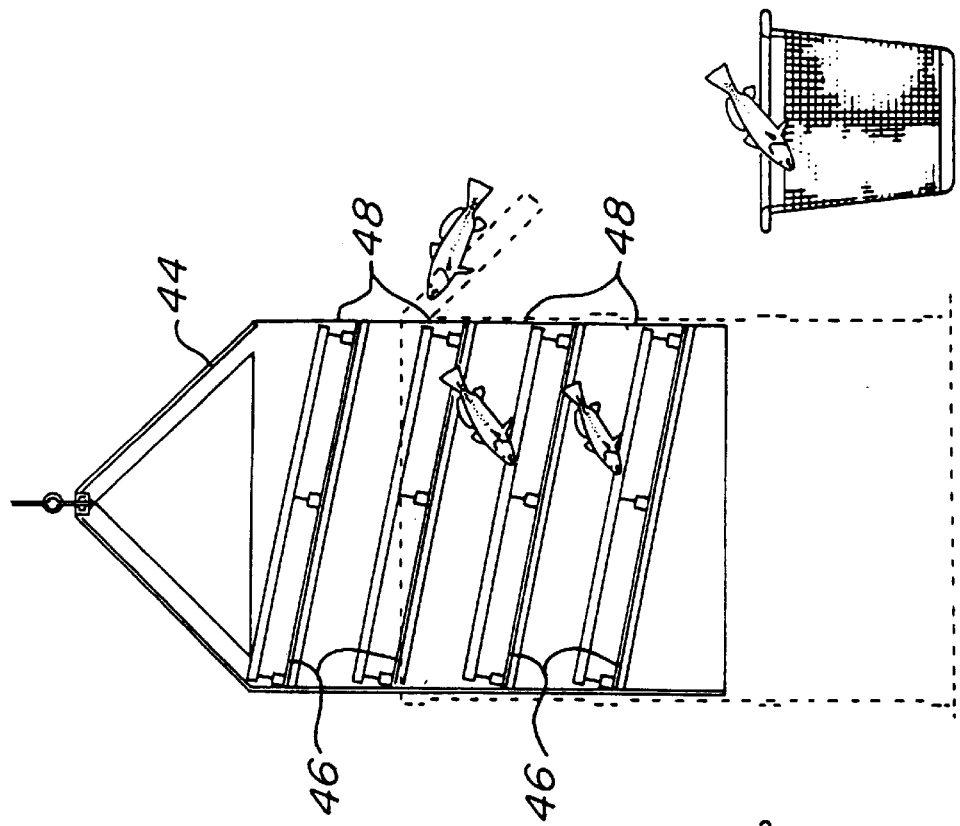
FIG. 7 is a side plan view, in cross-section, showing the insert box and grating panels within the panel box raised such that a second grading panel is level with the spillway.
Figure 9:
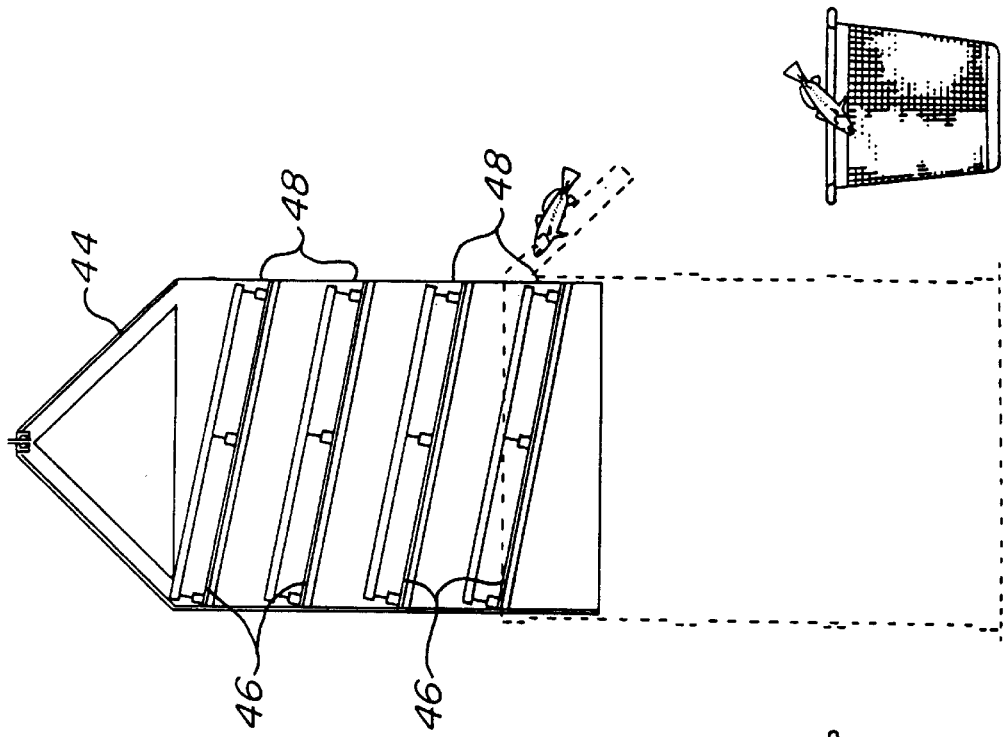
FIG. 9 is a side plan view, in cross-section, showing the panel box and grading panels within the panel box raised such that a fourth grading panel is level with the spillway.
Figure 8:
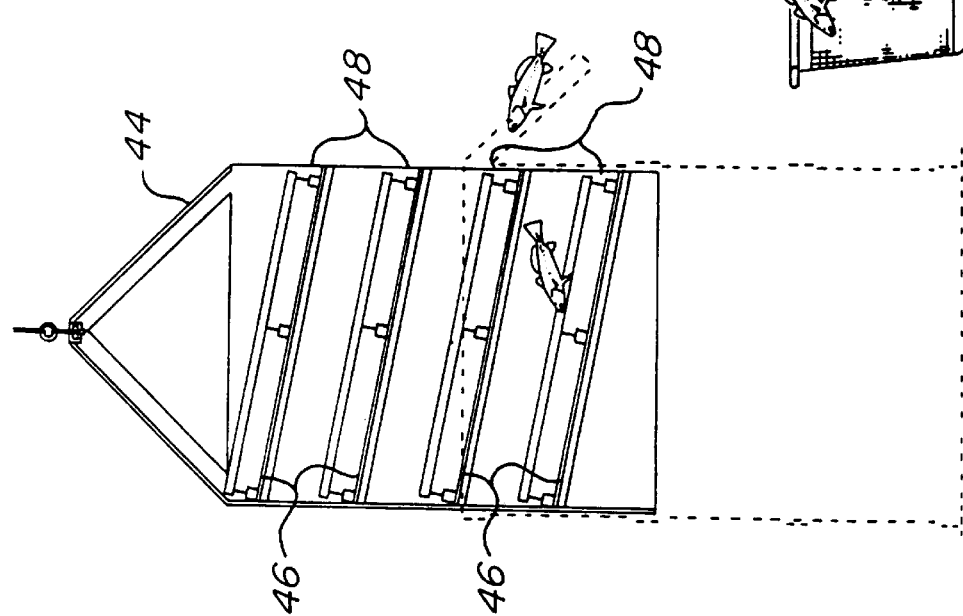
FIG. 8 is a side plan view, in cross-section, showing the panel box and grading panels within the panel-box raised such that a third grading panel is level with the spillway.

As shown in FIGS. 7–9, as panel box 12 is raised further, progressively smaller fish are pushed out of holding vat 10. As each grading panel 48 approaches the edge of spillway 14, a new basket 38 may be brought under spillway 14 to catch the fish in the next class size. For example, the topmost grading panel 48 of a four-panel grader may be designed to let all fish smaller than 12" pass through. The other panels may be designed to let fish of 10", 8", and 6" pass through, respectively. Thus when the first grading panel 48 reaches the spillway 14, fish that are 12" or longer will fall down spillway 14 into basket 38. As the next grading panel 48 is raised to spillway 14, a new basket 38 may be brought under the spillway 14 and will catch any fish that measure between 10" and 12" in length. The next group of fish will then be those that are between 8" and 10" in length, and then those that are between 6" and 8" in length. Finally, the bottom of panel box 12 can be raised to the edge of spillway 14 to retrieve all fish less than 8" in length. The bottommost grading panel is designed with spacings close enough together to inhibit the smallest fish from passing through.

In an alternative embodiment, a pivoting cutting chute (not shown) may be placed with its higher end under spillway 14 to direct the sorted fish to the correct basket 38 for that particular size class, or to direct the various size groups into different distribution chutes. As each grading panel 48 is raised to spillway 14, the cutting chute may be pivoted so that its lower end extends over the proper basket or distribution chute. Fish emerging from holding vat 10 and sliding down spillway 14 will then slide down the cutting chute and into the appropriate basket 38, or the appropriate distribution chute and then into the appropriate basket 38. In this embodiment, there is no need to move baskets 38 during the grading process; rather, the cutting chute must be redirected as each grading panel 48 reaches the level of spillway 14. Furthermore, the cutting chute may be linked to the panel box in such a way that as the panel box is raised through the holding vat, the cutting chute will automatically pivot horizontally such that the low end of the cutting chute is directly over the appropriate distribution chute at the point when the grading panel is level with the spillway. Fish of each particular size would then be directed automatically to the appropriate distribution chute and then into the appropriate basket 38.

What is claimed is:

1. A fish grader comprising:
   (a) a holding vat having an open top that may receive fish;
   (b) a panel box, said panel box fitting within said holding vat when said panel box is lowered and fitting through the open top of said holding vat when raised, said panel box comprising at least one grading panel wherein said grading panel comprises:
      (i) a plurality of evenly-spaced panel bars;
      (ii) a plurality of crossbars beneath said panel bars; and
      (iii) a plurality of panel bar supports attaching each panel bar to each crossbar and providing space between each panel bar and each crossbar;
   (c) means to raise and lower said panel box; and
   (d) a water pump hydraulically connected to said holding vat.

2. The fish grading according to claim 1, wherein said panel box comprises a plurality of grading panels stacked above one another, and said panel bars of each grading panel are spaced further apart than said panel bars of those grading panels beneath said grading panel.

3. The fish grader according to claim 1, wherein said holding vat has a front, a back, and two sides, and said fish grader further comprises a spillway having a upper and lower end, said spillway upper end attached to said holding vat front at said open top and said spillway lower end extending outward and downward from said open top.

4. The fish grader according to claim 3, wherein said panel bars lie at an angle with the plane of said open top, said panel bars extend longitudinally parallel to said holding vat sides, and the lowest ends of said panel bars are adjacent to the front of said holding vat.

5. The fish grader according to claim 3, further comprising:
   (a) a plurality of distribution chutes, each with an upper and lower end;
   (b) a cutting chute with an upper and lower end, said cutting chute upper end being disposed beneath said spillway lower end and said cutting chute being rotatable such that said cutting chute lower end is rotatable to be disposed above any of said distribution chute upper ends; and
   (c) at least one basket beneath the lower end of each said distribution chute to receive fish falling from that said distribution chute.

6. The fish grader according to claim 1, further comprising a valve hydraulically connected to said water pump and said holding vat that is adjustable to regulate the volume of water that enters said holding vat.

7. The fish grader according to claim 6, further comprising:
   (a) a tub disposed beneath said spillway lower end;
   (b) at least one basket removably placed within said tub to receive fish falling from said spillway lower end; and
   (c) a water conduit hydraulically connecting said water pump and said tub.

8. The fish grader according to claim 1, wherein said means to raise and lower said panel box comprises:
   (a) a pulley support assembly disposed above said panel box;
   (b) a pulley attached to said pulley support assembly above said panel box;
   (c) a winch; and
   (d) a cord with two ends, one end connected to said winch, the other end connected to said panel box, and said cord being threaded through said pulley.

9. The fish grader according to claim 1, wherein said means to raise and lower said panel box comprises a hydraulic lift attached to said panel box.

10. The fish grader according to claim 1, further comprising a mobile trailer to which said holding vat and said water pump are rigidly mounted.

11. The fish grader according to claim 10, wherein said mobile trailer comprises at least one leveling means.

12. A method for grading fish, said method comprising the steps of:
   (a) directing a flow of water up through a panel box, said panel box comprising at least one grading panel, and said panel box being lowered within a holding vat to which a spillway is attached;
   (b) placing fish within said holding vat above the highest of said grading panels;
   (c) raising said panel box until the highest of said grading panels is even with said spillway such that those fish unable to swim through the highest of said grading panels slide down the highest of said grading panels and down said spillway; and
   (d) continuing to raise said panel box until the next highest of said grading panels is even with said spillway, allowing fish to slide down said grading panel and down said spillway, until no fish remain in said panel box.

13. The method of claim 12, further comprising the steps of:
   (e) prior to step (c), placing a basket beneath said spillway whereby fish that slide down said spillway are caught in said basket; and
   (f) after step (c) and after each iteration of step (d), removing said basket beneath said spillway and placing an empty basket beneath said spillway.

14. The method of claim 12, further comprising the steps of:
   (e) for each of a plurality of distribution chutes, placing a basket beneath the lower end of each of said distribution chute;
   (f) prior to step (c), rotating said cutting chute such that the fish that slide down said spillway then slide down said cutting chute and are directed to one of said distribution chutes;
   (g) after step (c) and for each iteration of step (d), pivoting said cutting chute such that the lower end of said cutting chute is above a different distribution chute whereby fish that slide down said spillway then slide down a different one of said distribution chutes.

* * * * *